(12) United States Patent
Lundblad (10) Patent No.: US 9,004,824 B2
(45) Date of Patent: Apr. 14, 2015

(54) MILLING CUTTER AS WELL AS A MILLING INSERT THEREFOR

(75) Inventor: Mikael Lundblad, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 463 days.

(21) Appl. No.: 13/047,016

(22) Filed: Mar. 14, 2011

(65) Prior Publication Data

US 2011/0236142 A1    Sep. 29, 2011

(30) Foreign Application Priority Data

Mar. 23, 2010 (SE) .................................... 1050270

(51) Int. Cl.
*B23C 5/02* (2006.01)
*B23C 5/00* (2006.01)
*B23C 5/10* (2006.01)
*B23C 5/20* (2006.01)

(52) U.S. Cl.
CPC .................. *B23C 5/003* (2013.01); *B23C 5/109* (2013.01); *B23C 5/202* (2013.01); *B23C 2200/0416* (2013.01); *B23C 2200/208* (2013.01); *B23C 2210/282* (2013.01)

(58) Field of Classification Search
CPC ..................... B23B 2200/08; B23B 2200/081; B23B 2200/087; B23B 2200/205
USPC ........................... 407/33, 54, 66, 67, 113, 114
See application file for complete search history.

(56) References Cited

U.S. PATENT DOCUMENTS 5,383,750 A * 1/1995 Satran et al. .................. 407/113
5,924,824 A * 7/1999 Satran et al. .................... 407/34
5,947,649 A * 9/1999 Arai et al. ........................ 407/34
5,957,629 A   9/1999 Hessman et al.
6,290,436 B1  9/2001 Qvarth
7,189,030 B2 * 3/2007 Sheffler et al. .................. 407/34

(Continued)

FOREIGN PATENT DOCUMENTS

| CN | 1138837 | 12/1996 |
| CN | 2284113 | 6/1998 |

(Continued)

OTHER PUBLICATIONS

Office Action (and English translation) for Chinese Application No. 201110076962.1, dated Feb. 17, 2014.

*Primary Examiner* — Will Fridie, Jr.
(74) *Attorney, Agent, or Firm* — Morgan, Lewis & Bockius LLP (57) ABSTRACT

A milling cutter for chip removing machining, including a basic body rotatable in a predetermined direction around a center axis and having a front end surface and an envelope surface that extends axially backward from the front end surface and is concentric with the center axis. A number of indexable milling inserts are mounted in respective peripherally spaced-apart seats having a mutually fixed pitch, each milling insert including an upper side, an under side and at least one clearance surface, the clearance surface together with the upper side delimiting at least two alternately active cutting edges that are uniform in their extension between first and second end points. The cutting edges of each milling insert are situated on different levels in relation to the under side of the milling insert to alter the effective pitch between the active cutting edges of the milling inserts by indexing of at least one of the milling inserts.

32 Claims, 5 Drawing Sheets

(56) References Cited

U.S. PATENT DOCUMENTS

| | | | |
|---|---|---|---|
| 7,637,700 B2* | 12/2009 | Nishio et al. | 407/33 |
| 7,670,088 B2* | 3/2010 | Andersson et al. | 407/33 |
| 2003/0152430 A1 | 8/2003 | Mina | |
| 2009/0297282 A1 | 12/2009 | Mizutani | |
| 2010/0034601 A1 | 2/2010 | Ballas | |

FOREIGN PATENT DOCUMENTS

| | | |
|---|---|---|
| CN | 1324283 | 11/2001 |
| CN | 101056733 | 10/2007 |
| DE | 10350851 | 6/2005 |
| JP | 63-099116 | 4/1988 |
| JP | 2000-000714 | 1/2000 |

* cited by examiner

MILLING CUTTER AS WELL AS A MILLING INSERT THEREFOR

This application claims priority under 35 U.S.C. §119 to Swedish Patent Application No. 1050270-6, filed on Mar. 23, 2010, which is incorporated by reference herein in its entirety.

FIELD OF THE INVENTION

The present invention relates generally to a milling cutter for chip removing machining of the type that includes, on one hand, a basic body rotatable in a predetermined direction around a center axis and having a front end surface and an envelope surface that extends axially backward from the front end surface and is concentric with the center axis, and on the other hand a number of indexable milling inserts, which are mounted in peripherally spaced-apart seats having a mutually fixed pitch. The milling inserts individually include an upper side, an under side and at least one clearance surface, which, together with the upper side, delimits two or more alternately applicable cutting edges that are uniform in their extension between first and second end points. The invention also relates generally to a milling insert as such. Milling cutters of the kind in question are suitable for chip removing or cutting machining of workpieces of metal, such as steel, cast iron, aluminium, titanium, yellow metals, etc. The tools may also be used for the machining of composite material of different types.

BACKGROUND OF THE INVENTION

In milling in certain types of materials, at times problems arise in the form of regenerative vibrations. This phenomenon is particularly common when the milling tools are long or slender and the material (e.g., titanium) difficult to machine. Under unfavorable circumstances, the vibrations may cause great damage not only in the milling cutter and/or the workpiece, but also in the machine and its surroundings. A well-tried way to try to manage the vibration problems is to use milling cutters having a differential pitch, i.e., tools the milling inserts of which are unevenly distributed along the periphery of the milling cutter body. In such a way, initial tendencies to the emergence of vibrations can in many cases be extinguished before they have time to be fed back and built up to harmful amplitudes.

Previously known milling cutters of the type that has differentially pitched milling inserts have, however, limitations, more precisely as a consequence of the pitch between the milling inserts being invariable or fixed by the fact that the same is determined by the mutual placement of the seats or insert seats in which the milling inserts are mounted. This placement is established once and for all in connection with the manufacture of the milling cutter body and cannot be altered after that. However, the emergence of vibrations is dependent upon a number of complex factors difficult to predict, such as the dynamics of machine—tool and workpiece. Therefore, under unfavorable circumstances, the differential pitch in question may be inappropriate or unfit for the task of counteracting regenerative vibrations. A provisional measure to avoid harmful vibrations in the last-mentioned case—if possible—is to take away one or more milling inserts in order to, in such a way, alter the pitch between these and reduce the feedback. However, this leads to the feed speed, and thereby the productivity of the milling cutter, having to be reduced. Another provisional measure is to decrease the cutting depth, something which however also entails a reduced productivity.

The present invention aims at obviating the above-mentioned disadvantages of previously known milling cutters and at providing an improved milling cutter. Therefore, a primary object of the invention is to provide a milling cutter, the pitch of which between the active cutting edges of the milling inserts can, if required, be altered quickly and easily without the cutting depth or the number of milling inserts needing to be reduced, i.e., without any provisional, productivity deteriorating measures needing to be resorted to.

SUMMARY OF THE INVENTION

In an embodiment, the invention provides a milling cutter for chip removing machining, including a basic body rotatable in a predetermined direction around a center axis and having a front end surface and an envelope surface that extends axially backward from the front end surface and is concentric with the center axis. A number of indexable milling inserts are mounted in respective peripherally spaced-apart seats having a mutually fixed pitch, each milling insert including an upper side, an under side and at least one clearance surface, the clearance surface together with the upper side delimiting at least two alternately active cutting edges that are uniform in their extension between first and second end points. The cutting edges of each milling insert are situated on different levels in relation to the under side of the milling insert to alter the effective pitch between the active cutting edges of the milling inserts by indexing of at least one of the milling inserts.

In another embodiment, the invention provides an indexable milling insert, including an upper side, an under side, and at least one clearance surface which together with the upper side delimits at least two alternately active cutting edges that are uniform in their extension between first and second end points. The cutting edges are situated on different levels in relation to the under side of the milling insert.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

The exemplified milling cutter according to FIGS. 1-7 includes a basic body 1 and a number of peripherally spaced-apart milling inserts 2, which are replaceable. The basic body 1 is rotatable in a predetermined direction R around a center axis C1 and includes a front end surface 3 and an envelope surface 4 that extends axially backward from the front end surface and, in the example, is cylindrical. In this case, the surfaces 3, 4 are included in a front head 5, which transforms into a fixing part 6 being behind, which is longer as well as thinner than the head 5. In other words, the shown tool is in its entirety comparatively long and slender. In the example, the number of milling inserts is minimal, i.e., two.

Each milling insert 2 is mounted in a seat or insert seat 7 (see FIG. 2), which includes a bottom surface 8 and two side support surfaces 9, 10. Of these, the bottom surface 8 carries the tangential cutting forces that act on the milling insert during the rotation of the milling cutter, while the side support surface 9 carries (rearwardly directed) axial forces, and the side support surface 10 (inwardly directed) radial forces. Each individual seat 7 opens in a chip pocket 11. In the example, all surfaces 8, 9, 10 are generally plane.

Figures 1, 2, 3, 4:
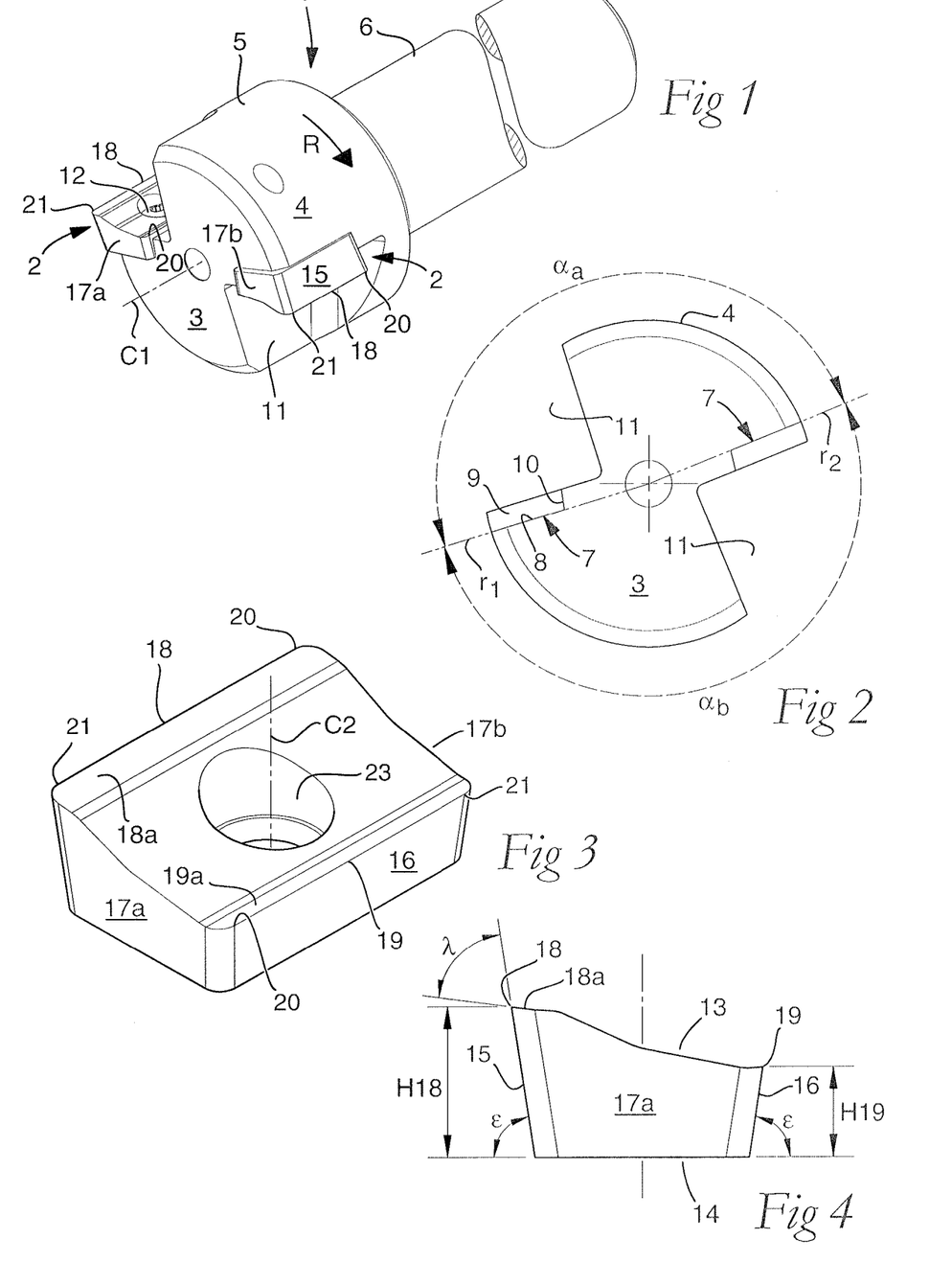
FIG. 1 is a perspective view of a milling cutter, for end or face milling, the basic body of which is equipped with two milling inserts.
FIG. 2 is an end view of the basic body without milling inserts, wherein it is illustrated how the seats of the milling inserts are placed with differential pitch.
FIG. 3 is an enlarged perspective view showing the individual milling insert according to an embodiment of the invention.
FIG. 4 is an end view of the milling insert according to FIG. 3.

In FIG. 2, it is seen how the two seats 7 are placed with a differentiated pitch in the basic body 1, more precisely so far that the two pitch angles $\alpha_a$ and $\alpha_b$ deviate from 180°. Accordingly, in the example, $\alpha_a$ amounts to approx. 175° and $\alpha_b$ to 185°. The angles $\alpha_a$ and $\alpha_b$ are formed between two radial lines $r_1$ and $r_2$, which both extend from the center axis C1 of the basic body and in the example coincide with the bottom surfaces 8 of the seats 7. It is axiomatic that the pitch between the seats 7 is fixed and invariable because the seats once and for all having the spatial locations thereof in the basic body 1 in connection with its manufacture. In this connection, it should be pointed out that the seats 7 in no way need to be located with the bottom surfaces thereof flush with the radial lines $r_1$ and $r_2$. Accordingly, the individual seat may be placed in different tipping-in positions (axially as well as radially and at positive as well as at negative tipping-in angles), wherein, however, the tipping-in positions of both seats should be identical. The pitch between the seats is accordingly determined by the pitch between homologous loci or reference points in the respective seats, irrespective of the spatial tipping-in positions thereof in the basic body.

As is shown in FIG. 1, the milling inserts 2 are in this case fixed in the appurtenant seats by screws 12. However, this does not exclude that the fixation may be provided in other ways, e.g., by clamps or tightening fingers.

Reference is now made to FIGS. 3 and 4, which on an enlarged scale illustrate the nature of the individual milling insert. In the milling insert, an upper side 13, an under side 14 as well as four side surfaces 15, 16, 17a and 17b are included. In the example, the Milling insert has an elongate basic shape and is indexable in two positions. The two diametrically opposed long sides 15, 16 form clearance surfaces, which individually transform into the upper side 13 via cutting edges 18, 19, the chip surfaces of which are designated 18a, 19a. In the example shown, the cutting edges 18, 19 are straight and extend between first and second end points 20, 21, which are those points where the cutting edges transform into round or arched corner edge sections 22. The straight shape of the cutting edges is conditioned by the connecting pairs of surfaces 15, 18a and 16, 19a, respectively, in this case being plane. The angle λ between the chip and clearance surfaces of the individual cutting edge, e.g. 18a, 15, is acute and may be within the range of 65-85°. It should also be pointed out that the two cutting edges 18, 19 are uniform in their extension between the two end points 20, 21.

Between the upper and under sides 13, 14, a through hole 23 extends for the screw 12. The center axis of the hole is designated C2. In the example, C2 also forms a center axis of the milling insert in its entirety, e.g., so far that the lower limiting lines of the clearance surfaces 15, 16 as well as the cutting edges 18, 19 are equidistantly spaced apart from C2.

In this connection, it should be pointed out that the two cutting edges 18, 19 are chip-removing main edges, which in practice often are combined with a surface-wiping wiper edge each, however not shown in the embodiment according to FIGS. 1-7.

Furthermore, it should be noted that each cutting edge 18, 19 in the schematic example according to FIGS. 1-7 runs parallel to the under side 14 (or the boundary line between the under side and the respective clearance surface 15, 16) as well as parallel to each other, the angle ε between the clearance surface 15 and 16, respectively, and the plane in which the under side 14 is situated being acute (in the example approx. 80°). In the example, the under side 14 of the milling insert is a plane surface. While keeping its general flatness, the under side may however also be shaped in other ways, e.g., in the form of a serration or connecting surface.

Characteristic of the milling insert according to the invention is that the two cutting edges 18, 19 in its entirety are situated on different levels or heights H18, H19 in relation to the under side 14. Accordingly, the first cutting edge 18, which is delimited between the chip surface 18a and the clearance surface 15, is located on a level H18 that is higher than the level H19 on which the second cutting edge 19 is situated. More precisely, analogous reference points, i.e., analogically selected reference points along the two cutting edges, are—generally expressed—situated on different levels above the plane in which the under side 14 is situated. For instance, the end points 21 are analogous to each other in so far that they are located at equally large axial distances from, for instance, the axially rear side support surface 9 of the seat 7 irrespective of the index position of the milling insert, i.e., irrespective of whether the cutting edge 18 or the cutting edge 19 is active by being turned radially outward in relation to the basic body. Although the level difference between the two cutting edges 18, 19 may vary, the height H18 should be at least 5%, suitably 10-20%, greater than H19. In the drawing, the difference in height is exaggerated for purposes of clarity.

Figure 5:
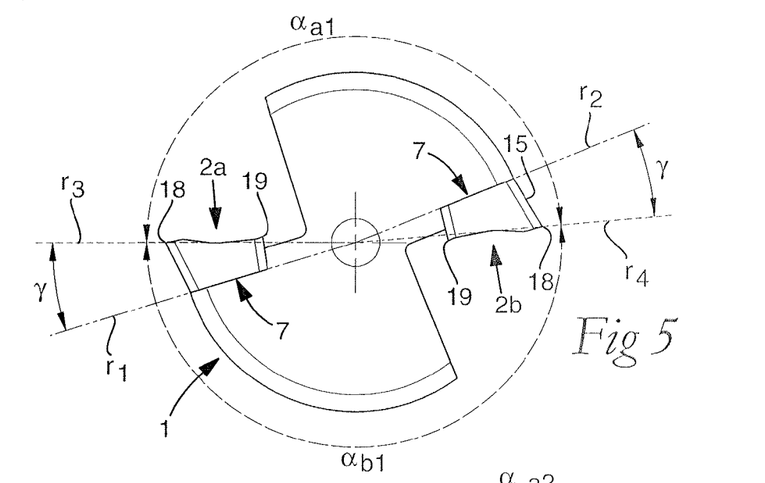
FIG. 5 is an end view of the basic body showing the milling inserts mounted in different index positions with the purpose of varying the effective pitch between the cutting edges thereof.
Figure 6:
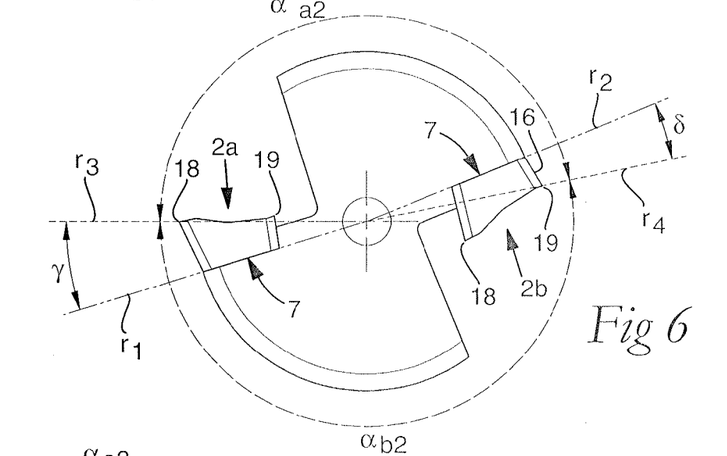
FIG. 6 is another end view of the basic body showing the milling inserts mounted in different index positions with the purpose of varying the effective pitch between the cutting edges thereof.
Figure 7:
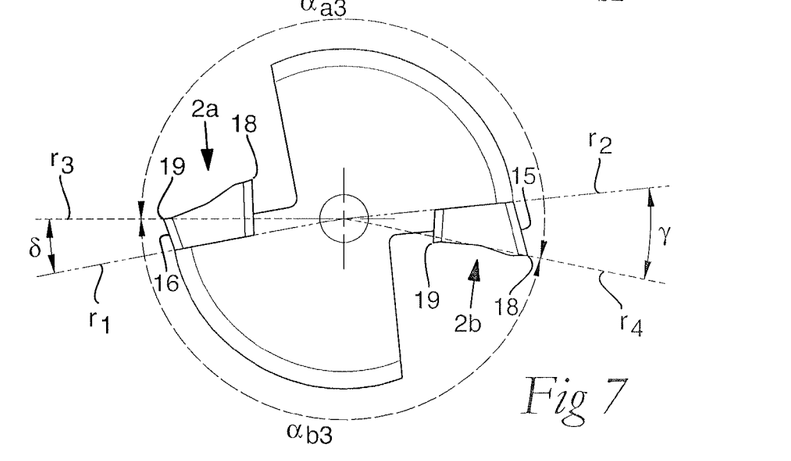
FIG. 7 is another end view of the basic body showing the milling inserts mounted in different index positions with the purpose of varying the effective pitch between the cutting edges thereof.
Figure 8:
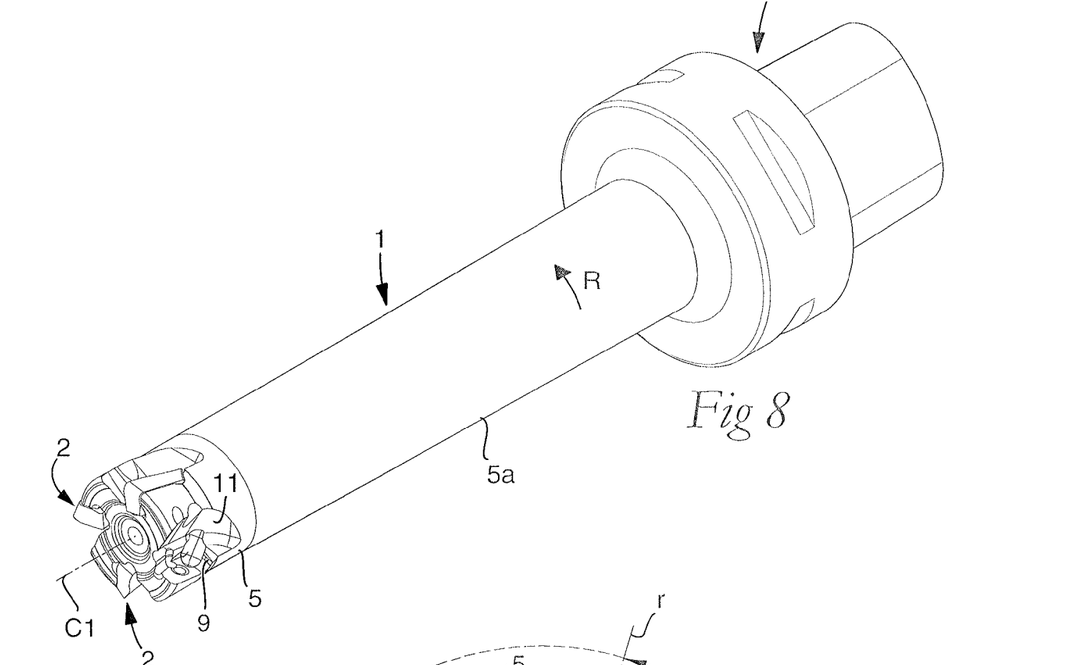
FIG. 8 is a perspective view of an alternative embodiment of a milling cutter equipped with four milling inserts.
Figure 9:
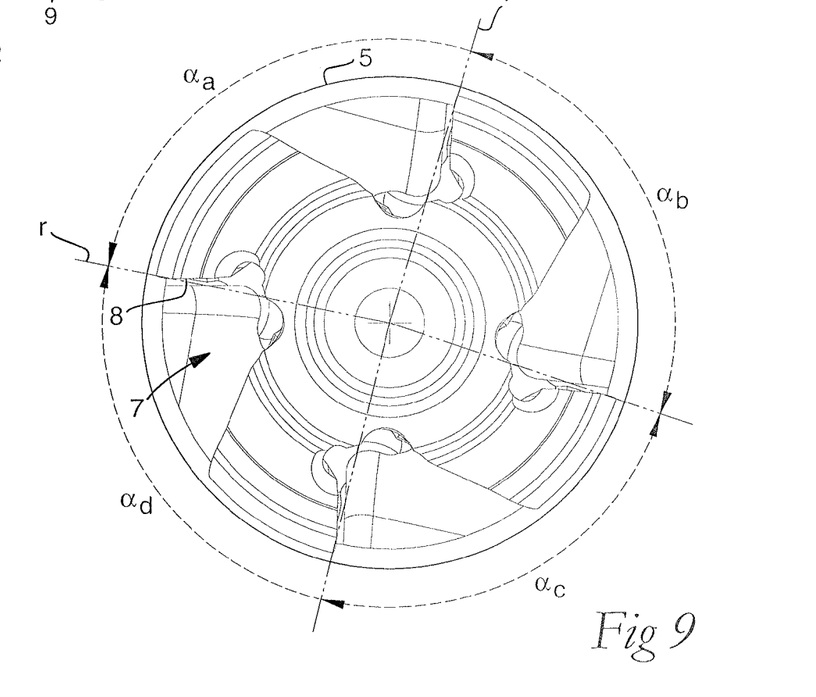
FIG. 9 is an enlarged end view of the basic body of the milling cutter shown in FIG. 8 without milling inserts.
Figure 10:
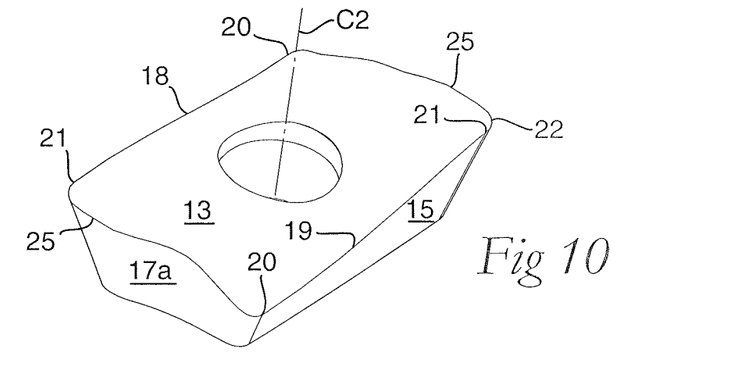
FIG. 10 is a view showing the nature of the milling insert used in the milling cutter according to FIG. 8.
Figure 11:
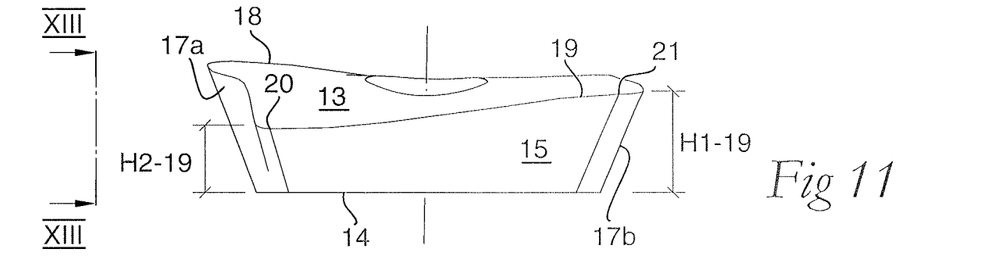
FIG. 11 is another view showing the nature of the milling insert used in the milling cutter according to FIG. 8.
Figure 12:
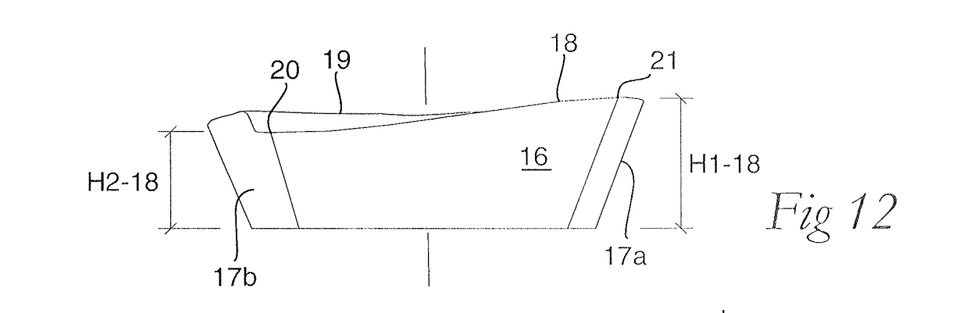
FIG. 12 is another view showing the nature of the milling insert used in the milling cutter according to FIG. 8.
Figure 13:
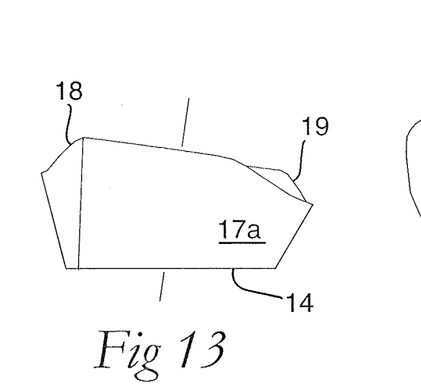
FIG. 13 is another view showing the nature of the milling insert used in the milling cutter according to FIG. 8.
Figure 14:
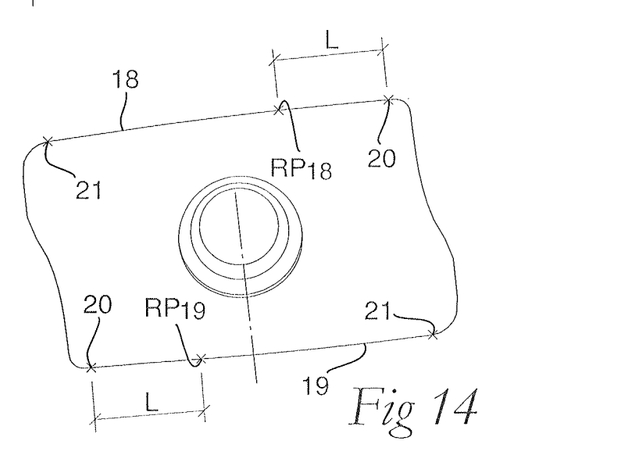
FIG. 14 is another view showing the nature of the milling insert used in the milling cutter according to FIG. 8.

Reference is now made to FIGS. 5-7, which illustrate the function and advantages of the invention. In FIG. 5, the two milling inserts 2 are shown mounted in one and the same way in the respective seat 7 since both cutting edges 18 (and clearance surfaces 15) are turned radially outward. In order to distinguish the mounted milling inserts in functional respect, in FIGS. 5-7, the same are designated 2a and 2b, respectively. When the two milling inserts are placed according to FIG. 5, the arc angle γ between the radial line $r_1$ and an imaginary radial line $r_3$, drawn from the center axis C1 and intersecting the cutting edge 18 of the milling insert 2a, will be equally great as the arc angle γ between the radial line $r_2$ and an imaginary radial line $r_4$ between the center axis C1 and the cutting edge 18 of the milling insert 2b. This means that the pitch angles $\alpha_{a1}$ and $\alpha_{b1}$ between the cutting edges 18 of the respective milling insert correspond to the fixed pitch angles $\alpha_a$ and $\alpha_b$ between the seats 7 (cf. FIG. 2). In other words, the effective pitch between the cutting edges corresponds to the fixed pitch between the seats.

In FIG. 6, the milling insert 2b is shown with the cutting edge 18 turned inward and the cutting edge 19 and the clearance surface 16, respectively, turned outward, at the same time as the milling insert 2a retains its previous position according to FIG. 5. This means that the arc angle δ between the radial lines $r_2$, $r_4$ becomes smaller than γ, hence it follows that the pitch angle $\alpha_{a2}$ between the respective cutting edges decreases at the same time as the pitch angle $\alpha_{b2}$ increases.

Suppose the fixed pitch angles $\alpha_a$, $\alpha_b$ between the seats 7 amount to 175° and 185°, respectively, and that γ amounts to 18° at the same time as δ amounts to 10°. Then the angle $\alpha_{a2}$ will amount to: 175−18+10=167°. Hence it follows that $\alpha_{b2}$ amounts to 193°. In other words, the effective pitch between the cutting edges has been altered by $\alpha_{a2}$ having decreased in relation to $\alpha_{a1}$ and $\alpha_{b2}$ increased in relation to $\alpha_{b1}$.

In FIG. 7, it is shown how the pitch between the cutting edges also can be altered in the reversed way. In this case, the milling insert 2a is turned with the cutting edge 19 outward and the cutting edge 18 inward at the same time as the milling insert 2b assumes the same position as in FIG. 5. This means that the angle $\alpha_{a3}$ will amount to 175−10+18=183°, whereby $\alpha_{b3}$ is reduced to 177°.

When the milling cutter is used, the milling inserts may initially be mounted in accordance with FIG. 5, i.e., with the same differential pitch between the cutting edges 18 as the fixed differential pitch between the seats 7. If it then would turn out that this pitch is not suitable to manage arising vibration tendencies, the pitch between the cutting edges can be altered by the simple measure of dismounting and indexing one milling insert (i.e., rotate the same by 180°), thereby either increasing or decreasing the angle $\alpha_a$ (under simultaneous decrease or increase of $\alpha_b$). Therefore, by one and the same milling cutter, possibility is given to quickly and easily test different, effective pitches, without because of this any milling insert needing to be removed from the basic body (or the cutting depth reduced).

Reference is now made to FIGS. 8-16, which illustrate an alternative embodiment of a milling cutter, which is equipped with four milling inserts. In this case, the basic body 1 is formed with a shaft-like, cylindrical part 5a, which carries the head 5 at its front end, and which at its rear end transforms into a sturdy fixing part 6. In order to accommodate the milling inserts 2, the basic body is formed with four seats 7, the fixed pitch of which is irregular in so far that all four pitch angles $\alpha_a$, $\alpha_b$, $\alpha_c$ and $\alpha_d$ differ mutually. Accordingly, in the concrete example, $\alpha_a$ amounts to 95°, $\alpha_b$ to 92.3°, $\alpha_c$ to 85°, and $\alpha_d$ to 87.7°. The radial lines r that define the pitch angles extend in this case from the center axis C1 and are tangent to the bottom surfaces 8 of the seats 7 along the radially outer boundary lines thereof (=homologous loci) since the seats in this case are tipped-in at a positive radial angle (the seats are also tipped-in at a positive axial angle).

Like the previously described milling insert, the milling insert according to FIGS. 10-14 includes an upper side 13, an under side 14, two clearance surfaces 15, 16, two end side surfaces 17a, 17b and two alternately applicable, uniform cutting edges 18, 19, which undertake the proper chip removal. Each such cutting edge extends between first and second end points 20, 21. In the mounted state in the seats of the basic body, the first end point 20 will always be located closest to the axially rear side support surface 9 of the individual seat irrespective of which index position the milling insert assumes.

A difference between the milling insert shown in FIGS. 10-14 and the previously described milling insert is that the first-mentioned one includes cutting edges 18, 19 that are not straight. Accordingly, the two cutting edges 18, 19 are arched or curved (in this case of two different dimensions or co-ordinate directions), and extend from a lowest end point, viz. the first end point 20, to a highest end point, which is the second end point 21. However, by analogy with the previous embodiment, the cutting edge 19 is countersunk in relation to the cutting edge 18. Accordingly, the first (and lowest situated) end point 20 of the cutting edge 19 is situated on the level H2-19 above the under side 14, while the first end point 20 of the cutting edge 18 is situated on a higher level H2-18 (see FIG. 12). Simultaneously, the second (and highest) end point 21 of the lowest situated cutting edge 19 is situated on a level H1-19, which is lower than the level H1-18 of the end point 21 of the cutting edge 18. In addition, the level difference between the lowest situated end points 20, 20 of the two cutting edges is equally great as the level difference between the highest situated end points 21, 21. This means that the two cutting edges 18, 19 generally are located on different levels above the under side 14. This principle applies irrespective of the shape (straight, curved, etc.) of the individual cutting edge provided that the different cutting edges are uniform and thereby alternately applicable. Arbitrarily selected, although analogous reference points along the respective cutting edges will also be located on different levels. Accordingly, in FIG. 14, a reference point RP18 is shown, which is situated at the distance L from the first end point 20 of the cutting edge 18. An analogous reference point RP19, i.e., a point that is spaced apart by the distance L from the first end point 20 of the cutting edge 19 along the second cutting edge 19, is accordingly located on a lower level than RP18.

It should furthermore be noted that the milling insert according to FIGS. 10-14 includes a surface-wiping secondary edge 25 (also denominated "wiper edge") for the co-operation with each chip-removing cutting edge 18, 19. The transitions between the chip-removing cutting edges 18, 19 and each secondary edge 25 are arched edge sections 22.

In the embodiment shown in FIGS. 3 and 4 as well as the embodiment according to FIGS. 10-14, the clearance surfaces 15, 16 extend all the way from the respective cutting edges down to the under side 14 of the milling insert. Because the cutting edges are situated on different levels in relation to the under side, the areas of the two clearance surfaces will, therefore, differ from each other. Accordingly, the clearance surface 16 has a larger area than the clearance surface 15.

Figure 15:
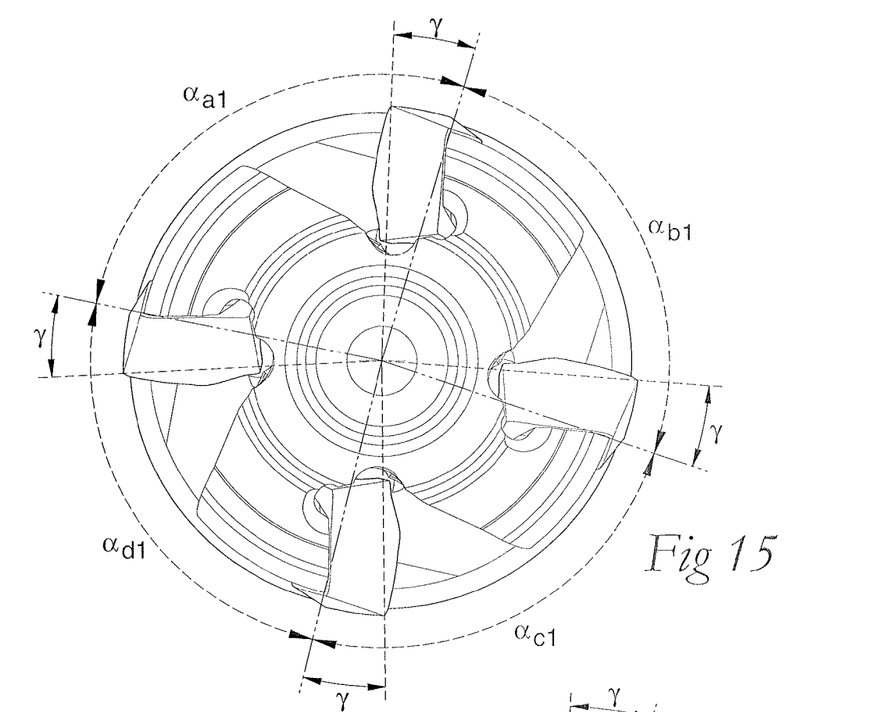
FIG. 15 is an end view of the milling cutter showing how the effective pitch between the cutting edges of the four milling inserts can be varied.
Figure 16:
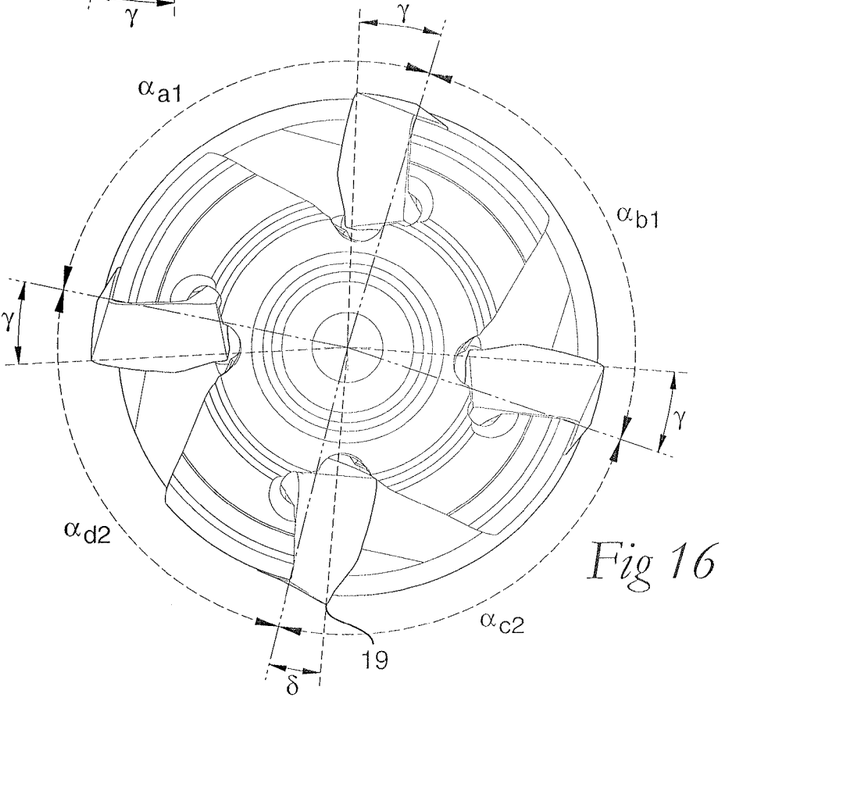
FIG. 16 is another end view of the milling cutter showing how the effective pitch between the cutting edges of the four milling inserts can be varied.

Reference is now made to FIGS. 15 and 16, which illustrate how the effective pitch between the cutting edges of the four milling inserts can be altered and varied in the previously described way. In FIG. 15, all four milling inserts are mounted with the cutting edges 18 (and the clearance surfaces 15)

turned radially outward, the arc angles γ being equally large. This means that the effective pitch angles $\alpha_{a1}$, $\alpha_{b1}$, $\alpha_{c1}$ and $\alpha_{d1}$ between the cutting edges correspond to the fixed pitch angles $\alpha_a$, $\alpha_b$, $\alpha_c$ and $\alpha_d$ between the seats 7 (see FIG. 9). In FIG. 16, one of the four milling inserts has been indexed so far that the (lowermost shown) cutting edge 19 as been turned radially outward. In such a way, the arc angle δ becomes smaller than γ. Without the pitch angles $\alpha_{a1}$ and $\alpha_{b1}$ being altered, the angles $\alpha_{c2}$ and $\alpha_{d2}$ will therefore be altered, more precisely in such a way that $\alpha_{c2}$ increases and $\alpha_{d2}$ decreases.

When the fixed pitch between the seats 7 is differentiated, as has been shown in the examples, the pitch angles between the seats may vary most considerably. However, the greatest pitch angle between two seats should be at least 1% greater than the smallest pitch angle between two seats. On the other hand, the greatest pitch angle between two seats should be at most 25% greater than the smallest pitch angle between two seats. In practice, the angle difference between the greatest and smallest pitch angle may advantageously be within the range of 2-20% or 3-15%. In the example according to FIGS. 8-16, the greatest pitch angle $\alpha_a$ (95°) is approx. 11% greater than the smallest angle $\alpha_c$ (85°).

The invention is not limited to the embodiments described above and schematically shown in the drawings. Accordingly, the invention may be applied to milling cutters that are equipped with a number of milling inserts other than two and four, respectively. Of course, the number of combination possibilities in terms of pitch adjustments increases with an increasing number of milling inserts. More precisely, the number of combination possibilities increases exponentially with an increasing number of milling inserts. Neither is the invention limited to indexable milling inserts having only two cutting edges. Accordingly, the milling insert could have a circular basic shape, the same including a single rotationally symmetric clearance surface, which transforms into the upper side via a plurality of arched edge sections, which are situated on different levels in relation to the under side of the milling insert. It is also possible to give the milling insert other polygonal basic shapes than the shown elongate and quadrangular one. Accordingly, the milling insert could be formed with three or more alternately applicable cutting edges, none of which are situated on the same height or level above the under side. Furthermore, it is possible to form ridge-like, corbelling-out material portions along the upper part of one or more clearance surfaces, which makes it possible to locate the cutting edge lines along different cutting edges in such a way that the same, in the mounted state of the milling insert, are located at exactly one and the same radial distance from the center axis of the basic body regardless which one of the cutting edges that as has been indexed up to the active position. It should furthermore be mentioned that the invention also may be applied to milling cutters having a uniform, fixed pitch between the seats of the basic body. Accordingly, the desired differential pitches between the active cutting edges of the milling inserts may very well be provided solely by, in the described way, indexing one or more milling inserts according to the invention. The invention is applicable to most types of milling cutters, also such ones that have a basic design that deviates from the ones exemplified. As an example, long-edge milling cutters should be mentioned.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A milling cutter for chip removing machining, comprising:
   a basic body rotatable in a predetermined direction around a center axis and having a front end surface and an envelope surface that extends axially backward from the front end surface and is concentric with the center axis; and
   a number of indexable milling inserts, which are mounted in respective peripherally spaced-apart seats having a mutually fixed pitch, each milling insert including an upper side, an under side and at least one clearance surface, the clearance surface together with the upper side delimiting at least two alternately active cutting edges that are uniform in their extension between first and second end points,
   wherein for each milling insert, a first active cutting edge in a first indexable position is at a first height in relation to the under side of the milling insert and a second active cutting edge in a second indexable position is at a second height in relation to the under side of the milling insert, the first height different from the second height, to alter the effective pitch between the active cutting edges of the milling inserts by indexing of at least one of the milling inserts, and
   wherein the effective pitch angles for each active cutting edge associated with the second cutting edge are equal to each other and different from the effective pitch angles for each active cutting edge associated with the first cutting edge.

2. The milling cutter according to claim 1, wherein the fixed pitch between the seats in the basic body is differentiated.

3. The milling cutter according to claim 2, wherein the greatest pitch angle between two seats is at least 1% greater than the smallest pitch angle between two seats.

4. The milling cutter according to claim 2, wherein the greatest pitch angle between two seats is at most 25% greater than the smallest pitch angle between two seats.

5. The milling cutter according to claim 1, wherein the different heights-above the under side of the milling insert differ by at least 5%.

6. The milling cutter according to claim 1, wherein the cutting edges of each milling insert are straight.

7. The milling cutter according to claim 1, wherein the cutting edges of each milling insert are at least partly curved in one or more co-ordinate directions.

8. The milling cutter according to claim 1, wherein the clearance surfaces adjacent to respective cutting edges have differently large areas extending from the respective cutting edges to the under side of the milling insert.

9. An indexable milling insert, comprising:
   an upper side;
   an under side; and
   at least one clearance surface which together with the upper side delimits at least two alternately active cutting edges that each extend between respective first and second end points,
   wherein a first cutting edge extends between the first end point and the second end point on a first of the at least two active cutting edges and has a first length,
   wherein a second cutting edge extends between the first end point and the second end point on a second of the at least two active cutting edges and has a second length, wherein a first reference point on the first cutting edge is at a first height in relation to the under side of the milling insert and a second reference point on the second cutting edge is at a second height in relation to the under side of the milling insert, wherein the first reference point as at a location along the first length of the first cutting edge that is analogous to a location of the second reference point along the second length of the second cutting edge, and wherein the first height is different from the second height.

10. The milling insert according to claim 9, wherein the first height above the under side is at least 5% higher than the second height.

11. The milling insert according to claim 9, wherein the first and second end points of the first cutting edge are at different heights above the under side of the milling insert than the first and second end points of the second cutting edge.

12. The milling insert according to claim 9, wherein the cutting edges are straight.

13. The milling insert according to claim 9, wherein the cutting edges are at least partly curved in one or more dimensions.

14. The milling insert according to claim 9, wherein clearance surfaces adjacent to respective cutting edges have differently large areas extending from the respective cutting edges to the under side of the milling insert.

15. The milling insert according to claim 9, wherein the first and second cutting edges run parallel to each other.

16. The milling insert according to claim 9, wherein the first and second cutting edges run parallel to a plane containing the under side of the milling insert.

17. An indexable milling insert, comprising:
an upper side;
an under side; and
at least one clearance surface which together with the upper side delimits at least two alternately active cutting edges that each extend between respective first and second end points,
wherein a first cutting edge extends between the first end point and the second end point on a first of the at least two active cutting edges and has a first length,
wherein a second cutting edge extends between the first end point and the second end point on a second of the at least two active cutting edges and has a second length,
wherein, over an entirety of the first length, the first cutting edge is at a different level in relation to a plane containing the underside of the milling insert than the second cutting edge over an entirety of the second length.

18. The milling insert according to claim 17, wherein the difference in levels between a lowest end point on each of the first and second cutting edges is the same as the difference in levels between a highest end point on each of the first and second cutting edges.

19. An indexable milling insert, comprising:
an upper side;
an under side; and
at least one clearance surface which together with the upper side delimits at least two alternately active cutting edges that each extend between respective first and second end points,
wherein a first length of cutting edge extends between the first end point and the second end point on a first of the at least two active cutting edges and a second length of cutting edge extends between the first end point and the second end point on a second of the at least two active cutting edges, wherein the first length and the second length are the same, and wherein at an analogous reference point along the first length and the second length the first cutting edge is at a different height in relation to a plane containing the under side of the milling insert than the second cutting edge.

20. A milling cutter for chip removing machining, comprising:
a basic body rotatable in a predetermined direction around a center axis and having a front end surface and an envelope surface that extends axially backward from the front end surface and is concentric with the center axis; and
at least two identical indexable milling inserts, which are mounted in respective peripherally spaced-apart seats having a mutually fixed pitch, each milling insert including an upper side, an under side and at least one clearance surface, the clearance surface together with the upper side delimiting at least two alternately active cutting edges that are uniform in their extension between first and second end points,
wherein an analogous reference point along each of the at least two cutting edges of each milling insert are on different levels in relation to a plane containing the under side of the milling insert, with a first cutting edge on a first level and a second cutting edge on a second level
wherein, in a first index position with all of the milling inserts having the first cutting edges as the active cutting edges, the effective pitch angles for each active cutting edge are equal; and
wherein, in a second index position with at least one but less than all of the milling inserts having the second cutting edge as the active cutting edge, the effective pitch angles for each active cutting edge associated with the second cutting edge are equal to each other and different from the effective pitch angles for each active cutting edge associated with the first cutting edge.

21. The milling cutter according to claim 20, wherein the difference in levels between a lowest end point on each of the first and second cutting edges is the same as the difference in levels between a highest end point on each of the first and second cutting edges.

22. The milling cutter according to claim 20, wherein the fixed pitch between the seats in the basic body is differentiated.

23. The milling cutter according to claim 22, wherein the greatest pitch angle between two seats is at least 1% greater than the smallest pitch angle between two seats.

24. The milling cutter according to claim 22, wherein the greatest pitch angle between two seats is at most 25% greater than the smallest pitch angle between two seats.

25. The milling cutter according to claim 20, wherein the different levels-above the under side of the milling insert differ by at least 5.

26. The milling cutter according to claim 20, wherein analogous portions of the cutting edges of each milling insert extend between end points that are at different heights in relation to the under side of the milling insert.

27. The milling cutter according to claim 20, wherein the cutting edges of each milling insert are straight.

28. The milling cutter according to claim 20, wherein the cutting edges of each milling insert are at least partly curved in one or more co-ordinate directions.

29. The milling cutter according to claim 20, wherein the clearance surfaces adjacent to respective cutting edges have differently large areas extending from the respective cutting edges to the under side of the milling insert.

30. The milling insert according to claim 9, wherein a shape, length and orientation relative to the under side of the milling insert of the first cutting edges are the same as a shape, length and orientation relative to the under side of the milling insert of the second cutting edge.

31. The milling insert according to claim 17, wherein a shape, length and orientation relative to the under side of the milling insert of the first cutting edge are the same as a shape, length and orientation relative to the under side of the milling insert of the second cutting edge.

32. The milling insert according to claim 19, wherein a shape, length and orientation relative to the under side of the milling insert of the first cutting edge are the same as a shape, length and orientation relative to the under side of the milling insert of the second cutting edge.

* * * * *